United States Patent [19]

Spoto

[11] Patent Number: 5,660,254
[45] Date of Patent: Aug. 26, 1997

[54] DRY ROTARY DAMPER

[75] Inventor: Louis M. Spoto, Sleepy Hollow, Ill.

[73] Assignee: Illinois Tool Works Inc., Glenview, Ill.

[21] Appl. No.: 566,674

[22] Filed: Dec. 4, 1995

[51] Int. Cl.⁶ .................................................. F16F 7/04
[52] U.S. Cl. ............................ 188/290; 267/215; 192/46
[58] Field of Search ............................. 188/290, 268, 188/293, 381, 83, 134, 30, 82.1, 292, 130; 192/12 B, 46; 267/215, 214, 205, 208

[56] References Cited

U.S. PATENT DOCUMENTS

| | | | |
|---|---|---|---|
| 408,090 | 7/1889 | Dille | 192/46 |
| 3,472,347 | 10/1969 | Johnson | 192/46 X |
| 3,809,196 | 5/1974 | Moribe | 192/12 B |
| 4,009,770 | 3/1977 | Schreyer | 188/134 X |
| 4,691,811 | 9/1987 | Arakawa et al. | 188/290 |
| 4,893,522 | 1/1990 | Arakawa | 188/290 X |
| 5,277,282 | 1/1994 | Umemura | 188/293 X |
| 5,522,485 | 6/1996 | Takahashi et al. | 188/290 X |

FOREIGN PATENT DOCUMENTS

9420646 U  12/1994  Germany.

*Primary Examiner*—Josie Ballato
*Attorney, Agent, or Firm*—Schwartz & Weinrieb

[57] ABSTRACT

A dry rotary damper includes a housing defining an internal chamber, the housing having a closed base portion, a top portion with a through opening, and a rotor-engaging internal surface. A rotor has a shaft rotatably passing through the opening and an engagement surface in sliding frictional engagement with the rotor-engaging internal surface of the housing. A deflection member is mounted within the chamber. An edge part of the deflection member impinges upon the rotor and the deflection member is deflected for resiliently urging the engagement surface into frictional engagement with the rotor-engaging internal surface of the housing.

18 Claims, 2 Drawing Sheets

DRY ROTARY DAMPER

FIELD OF THE INVENTION

This invention relates to a damper for damping movement between two relatively moveable elements, and more particularly to a rotary damper. Still, more particularly, the invention relates to a dry rotary damper, that is, one which provides a damping action by a frictional engagement, rather than by the action of a viscous liquid such as silicone or the like.

Generally speaking, rotary dampers are well known. One type of rotary damper which has found widespread acceptance is shown in U.S. Pat. No. 4,691,811. In this patented damper, a viscous liquid such as grease, silicone, or the like is utilized to provide the damping action as a rotor with a brake plate is rotated in a housing containing the viscous liquid. One problem which has arisen with such liquid-filled dampers is that of potential leakage of the viscous liquid and consequent loss of the damping action. The above-mentioned patent particularly addresses this problem and provides a structure including a sealing O-ring fitted to the shaft of the rotor and sonic welding of the housing or casing parts for alleviating this problem. However, there remains room for further improvement.

While the rotary damper of the above-mentioned patent has proven successful in operation, it is nonetheless possible that the viscous liquid could be lost due to damage or cracking of the case, damage to the O-ring shaft or related parts in contact therewith or the like. Moreover, there remains a problem which is attendant an inherent property of silicone or other viscous fluids, namely their change in viscosity with ambient temperature changes. This temperature-dependent viscosity property can cause the performance characteristics of the damper to change with changing ambient temperatures. However, in most applications, it is desired that the performance be relatively uniform, rather than temperature variant.

Another rotary damper is shown in German Utility Model Application No. 9420 646.5, which uses a spring element (shown as a wave washer) to press a rotor against a soft disc that is "used as a gliding surface with specified friction". However, the soft disc and the wave washer can add complexity and expense to the manufacture and assembly of such a damper.

OBJECTS AND SUMMARY OF THE INVENTION

Accordingly, it is a general object of the invention to provide a novel and improved rotary damper device.

A more specific object is to provide a dry rotary damper device, that is, one which does not utilize a viscous liquid to provide the damping action.

Yet another object is to provide such a dry rotary damper which does not introduce significant complexity or expense in the parts needed for its manufacture and assembly, but relies on relatively simple and inexpensive parts and techniques of assembly.

Briefly, and in accordance with the foregoing objects, a dry rotary damper in accordance with the invention comprises a housing having an internal chamber, said housing comprising a base portion, a top portion having a central opening, and a rotor-engaging internal surface; a rotor having a shaft rotatably passing through through the central opening and an engagement surface in sliding frictional engagement with the rotor-engaging internal surface of the housing; a deflection member, and mounting means for positioning the deflection member within the chamber with an edge part of the deflection member impinging upon the rotor and for deflecting the deflecting member so as to resiliently urge the engagement surface of the rotor into frictional engagement with the rotor-engaging internal surface of the housing.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements throughout the several views, and in which:

DETAILED DESCRIPTION OF THE ILLUSTRATED EMBODIMENT

Figure 1:
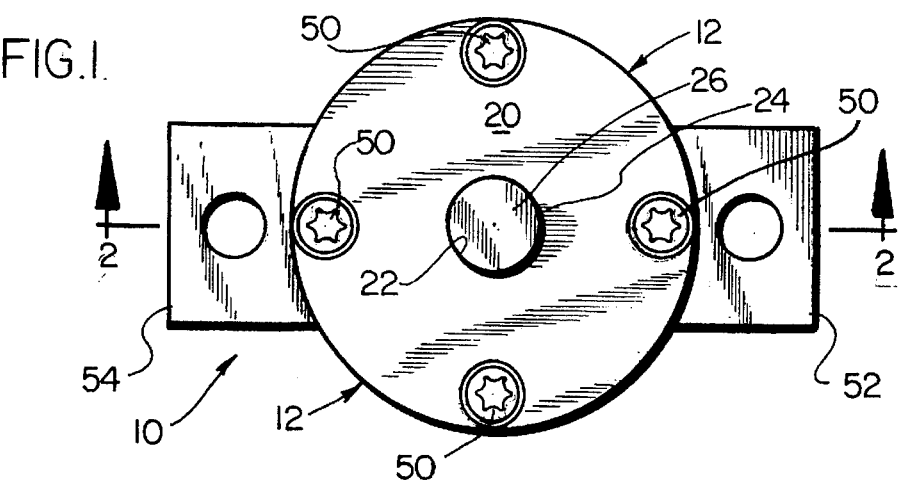
FIG. 1 is a top plan view of a dry rotary damper in accordance with the invention.
Figure 2:
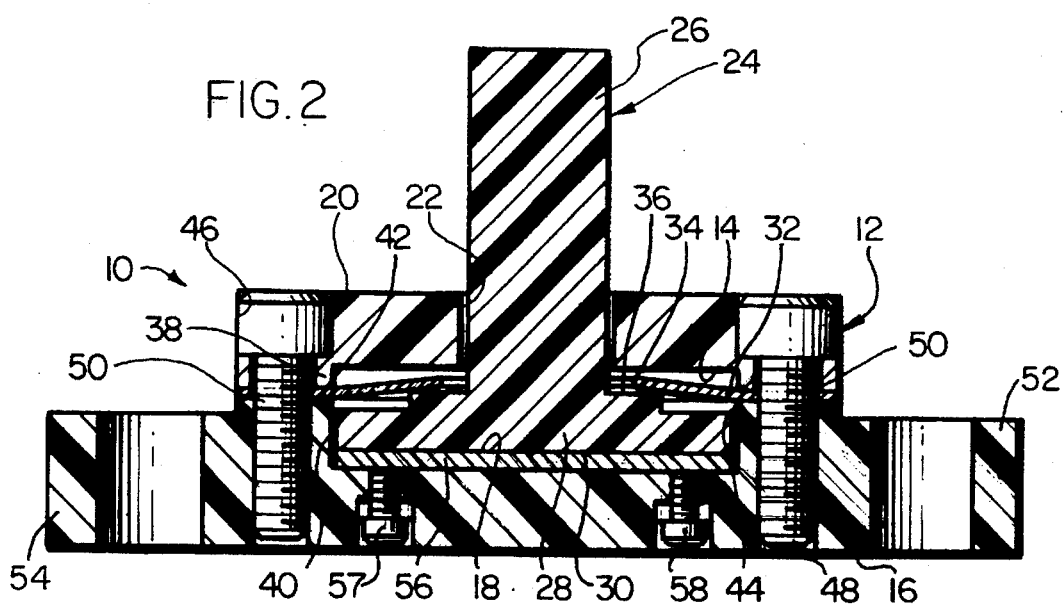
FIG. 2 is a section in elevation through the rotary damper of FIG. 1 as taken along line 2—2 of FIG. 1.

Referring now to the drawings and initially to FIGS. 1 and 2, a dry rotary damper in accordance with the invention is designated generally by the reference numeral 10. The dry rotary damper 10 comprises a housing 12 which defines an internal chamber 14. The housing 12 in turn comprises a closed base member or portion 16 having a rotor-engaging internal surface 18 which in the illustrated embodiment is a generally flat, circular surface. The surface 18 defines one boundary of the chamber 14. The rotor-engaging surface need not be circular or flat, and may be defined on another internal surface of the housing, without departing from the invention. The housing 12 further comprises a top or cover portion 20 which has a central opening 22, which is circular in the illustrated embodiment.

A rotor 24 has a rotor shaft 26 which rotatably passes through the central opening 22 of the housing top or cover portion 20, and an engagement surface 30 which is located internally of the chamber 14 defined in the housing 12. In the illustrated embodiment, the rotor 24 has a generally circular disk portion which defines the engagement surface 30 which is in rotatable sliding frictional engagement with the rotor-engaging internal surface 18 of the housing base portion 16. Thus, in the illustrated embodiment, the engagement surface 30 of the rotor disk 28 is generally flat and circular, so as to be generally complementary in form with the generally flat circular rotor-engaging surface 18. The engagement surface may be defined by a different surface of the rotor without departing from the invention, so long as it frictionally engages some rotor-engaging surface of the housing.

In accordance with the invention, a resilient means or deflection member 32 is disposed in the chamber 14 for resiliently urging the rotor disk engagement surface 30 into frictional engagement with the rotor-engaging internal surface 18 of the housing bottom portion 16. In the illustrated embodiment, the resilient means or deflection member 32 comprises a generally flat, annular member or disk, which may be stamped or otherwise formed from a relatively thin sheet of material, preferably a metal material. Other shapes may be utilized for the deflection member without departing from the invention. Primarily because of the shape and thinness of the disk 32, it is resiliently deformable so as to resiliently urge the rotor disk 28 in a direction such that its engagement surface 30 is in frictional contact with the facing rotor-engaging surface 18, in the manner illustrated in FIG. 2.

Cooperatively, the dry rotary damper further includes mounting means, for positioning the flat annular member 32 within the chamber 14 such that the rotor shaft 26 projects freely through the annular member 32 and such that an inner edge part 34 of the annular disk 32 impinges upon the rotor disk 28 on a side 36 thereof opposite its engagement surface 30, for thereby resiliently urging the engagement surface 30 of the rotor disk 28 into frictional engagement with the rotor-engaging surface 18 of the housing 12.

In the illustrated embodiment, the mounting means for so positioning the annular disk 32 comprise mutually inwardly projecting side walls 38, 40 of the housing base 16 and top portion 20, which side walls 38, 40 define aligned and facing annular edges 42, 44 for engaging the flat annular member 32 therebetween. This engagement is generally radially outwardly of the impinging of the inner edge 34 of the disk 32 upon the upper surface 36 of the rotor disk 28. Moreover, the respective edges 42 and 44 are located such that they engage the annular disk 32 in a plane lower than the plane in which its inner edge 34 contacts or impinges the upper surface 36 of the rotor disk 28, so as to thereby resiliently deflect the flat annular member 32, as is illustrated in FIG. 2, for exerting a force upon the rotor disk 28.

The amount of force exerted is affected by a number of factors, including the selection of the material and thickness of the annular disk 32, and the amount of deflection applied thereto by the housing 12 relative to the rotor disk 28. This amount of exerted force is also influenced by the effective beam length of the deflection member 32 between its fixed or held end and the point at which it is deflected. The geometry of the deflection member 32 also affects the amount of force exerted, for example, when formed as a flat annular disk, it could have cutouts about its central opening to provide a weaker force.

Finally, suitable holding means are provided for securing the housing top and base portions 20, 16 into engagement about the flat annular member 32 for maintaining the deflection thereof and for maintaining the dry rotary damper assembly 10 in an assembled condition. In the illustrated embodiment, these holding means comprise aligned through apertures 46 and 48 in the respective base 16 and top 20 and suitable fasteners, here shown as threaded fasteners 50, which extend through these openings and respectively join the top 20 and base 16. In this regard, the through openings 48 may be provided with a suitable mating thread. Other means of securing these parts together include fasteners of a different type, adhesives, sonic welding or other procedures, and may be utilized without departing from the invention, so long as they maintain the unit assembled and maintain desired deflection upon the annular member 32.

Also, if desired, the friction between the surfaces 18 and 30 may be further controlled by the application of a small amount of a grease or lubricant. If desired, one or more shallow annular grooves (not shown) may also be formed in the surface 18 to accommodate a small quantity of such, a lubricant. Preferably, the lubricant would take the form of a relatively high viscosity grease or gel, such that it would be retained within the grooves or otherwise between the surfaces 18 and 30 and not pose a problem of leakage or migration, as with silicone or like materials.

This friction may also be further controlled by the selection of materials for the respective parts including the rotor 24 and the housing base portion 16, which may be of similar or dissimilar materials to impart desired frictional properties to the engagement between the surfaces 18 and 30. Preferably, however, the rotor 24 and housing 12 are formed from relatively durable, moldable plastic materials. In the illustrated embodiment, the rotary damper of FIGS. 1 and 2 additionally has oppositely outwardly extending through-apertured mounting tabs or ears 52, 54.

In the embodiment illustrated in FIG. 2, an additional, and optional, adjusting means or arrangement is shown for selectively varying the amount of deflection of the flat annular member 32. In FIG. 2, this adjusting means takes the form of means for changing the effective height of the rotor-engaging internal surface 18 of the base portion 16. This is done by providing an additional plate or disc 56 on which this internal surface 18 is defined, intermediate the rotor 24 and the base 16. A pair of adjusting screws 57 and 58 are threadably engaged with the base 16 and bear against an underside of this plate or disc 56. Preferably, the adjusting screws 57 and 58 are recessed within the base 16.

Referring now to the remaining figures of drawings, a dry rotary damper according to a second embodiment of the invention is designated generally by the reference numeral 110. Similar reference numerals with the prefix 1 will be used to designate those parts and components of the dry rotary damper of FIG. 3 which are similar to components of the dry rotary damper of FIGS. 1 and 2.

Accordingly, the dry rotary damper 110 includes a housing 112 having a base portion 116 and a top portion 120. The top 120 has a central through opening 122 through which projects the shaft 126 of a rotor 124. The rotor 124 also has a rotor disk portion 128.

The base 116 has a rotor-engaging surface 118 which in the illustrated embodiment is a generally flat, annular surface. Cooperatively, the rotor disk 128 has an engagement surface 130 which is also annular in form so as to be complementary with and engage the surface 118. The rotor 124 is formed with a generally annular skirt or extension 131 on which this surface 130 is formed. Cooperatively, the base 116 is formed with a generally annular well portion 115 so as to define a form complementary with the extension 131 of the rotor disk 128. It should be noted that the rotor disk 128 and the base 116 rotate freely and out of contact with respect to each other except at their facing complementary annular surfaces 118 and 130.

A flat annular resilient means or member 132 is held clamped at a radially outer edge portion thereof between a shoulder surface or portion 142 formed in upwardly extending side wall 140 of the base 116 and a facing surface 144. The surface 144 in the illustrated embodiment is formed on an annular ring or spacer member 143 which is interposed between an undersurface 145 of the top 120 and the annular resilient member 132. However, this member 143 may also comprise an extension of the top 120 without departing from the invention. In similar fashion to the embodiment of FIGS. 1 and 2, the surface 118 may have one or more shallow annular grooves (not shown) formed therein for accommodating a small quantity of a lubricant material. The considerations applicable to the frictional engagement between these surfaces 118 and 130 are the same as those mentioned above in the description of the embodiment of FIGS. 1 and 2.

Figure 3:
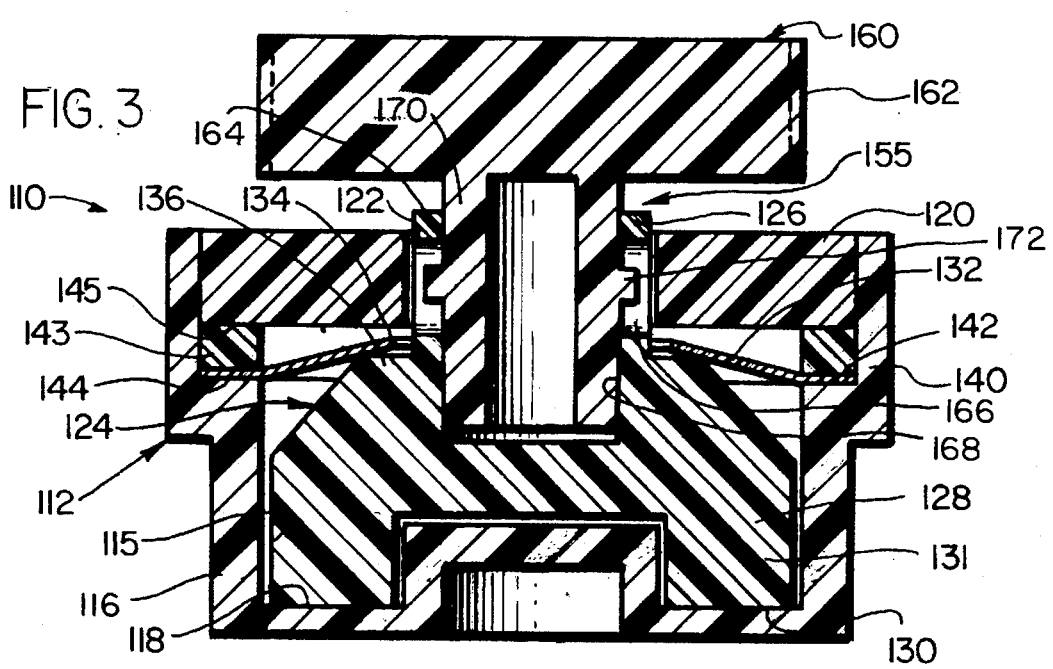
FIG. 3 is a section in elevation, similar to FIG. 2, showing a second embodiment of a dry rotary damper in accordance with the invention, further incorporating a unidirectional mechanism.

Similar to the embodiment of FIGS. 1 and 2, the resilient annular member 112 is held by the surfaces 142 and 144 in a plane lower than the plane in which its inner edge 134 contacts an upper surface 136 of the rotor 124, thus causing a deflection as best viewed in FIG. 3. The base 116 and top 120 of the housing 112 may be joined by suitable means such as by suitable adhesive, or sonic welding or the like.

In addition to the basic structure of the dry rotary damper 110 as described above, the dry rotary damper 110 of FIGS. 3 through 7 further includes a unidirectional rotation means or structure 155 which interconnects the rotor shaft 126 with a driven member 160. In the illustrated embodiment, this driven member 160 includes a gear 162 whose rotation is regulated by the dry rotary damper 110 of FIGS. 3 through 7. Referring now also to FIGS. 4 through 7, this unidirectional rotation means 155 which operatively interconnects the driven member 160 with the rotor shaft 126 is illustrated in further detail.

In the illustrated embodiment, one placement of the two component parts of the unidirectional rotation means is shown with respect to the rotor shaft 126 and a mating projecting portion 170 of the driven member 160. However, it should be understood that the reverse arrangement may be utilized without departing from the invention.

Figure 4:
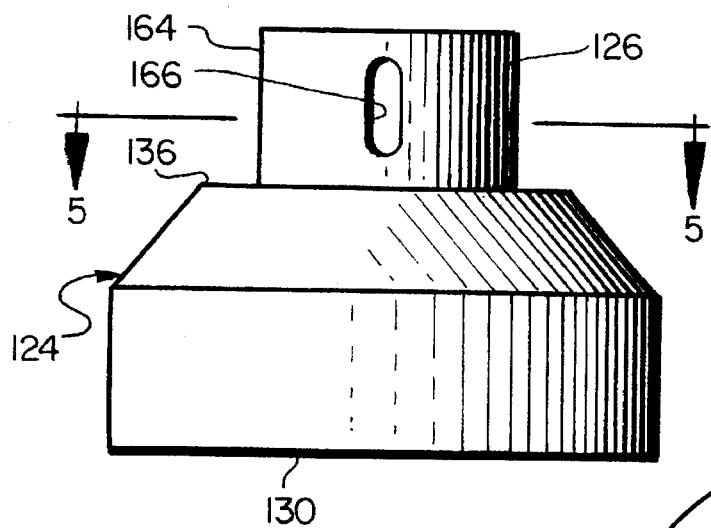
FIG. 4 is an elevation of the unidirectional mechanism located in the rotor portion of the damper of FIG. 3.
Figure 5:
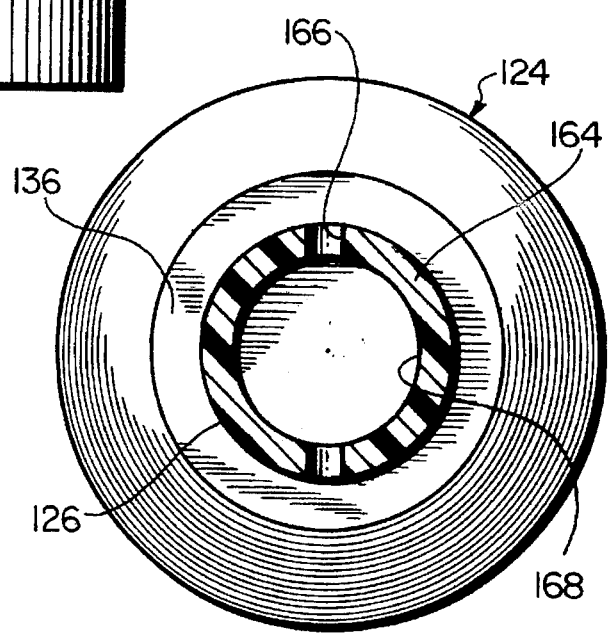
FIG. 5 is a partial sectional view of that portion of the unidirectional mechanism shown in FIG. 4 as taken along the line 5—5 of FIG. 4.
Figure 6:
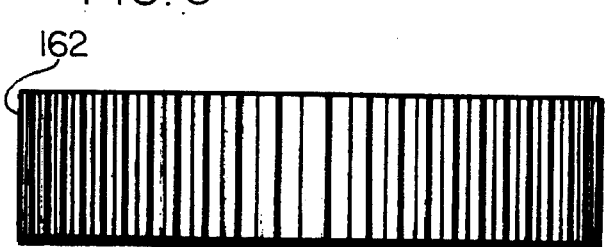
FIG. 6 is an elevational view of a second portion of the unidirectional mechanism of the damper of FIG. 3.

As here illustrated, the rotor shaft 126 comprises or includes a cylindrical sleeve 164, as best viewed in FIGS. 4 and 5. The sleeve 164 has a detent structure formed thereon which in the illustrated embodiment takes the form of a pair of oppositely aligned elongated slots 166 which have generally rounded end surfaces and extend generally coaxially with the cylindrical sleeve 164. As shown, the slots 166 extend through the sleeve 164. The slots 166 are elongated in the illustrated embodiment to accommodate any longitudinal offset between the gear 162 and a mating gear or rack (not shown). That is, these slots permit some longitudinal movement by the gear 162, without pulling or pushing the rotor 124 longitudinally.

Cooperatively, the driven, member 160 has a projecting generally cylindrical split sleeve 170 which has an outer diameter sized for slidably rotatably interfitting with an inner surface 168 of the cylindrical sleeve 164 of the shaft 126. The split sleeve 170 includes a mating detent structure 172 for engagement with the detent structure or slots 166 of the sleeve 164. These detent structures 166 and 172 are arranged for engagement such that relative rotation between the split sleeve 170 and the sleeve 164 is permitted in one direction and prevented in the opposite direction.

In this latter regard, the split sleeve 170 comprises a generally cylindrical wall having at least one L-shaped through slit 174 which extends longitudinally and circumferentially thereof. In the illustrated embodiment, two of these L-shaped slots are formed generally 180° opposite each other, as best viewed in FIG. 7. The mating detent structure 172 comprises a generally circular or cylindrical boss which projects radially outwardly from a cut out portion 176 of the cylindrical wall 170 which is defined by the L-shaped slit 174. Preferably, the circular boss 172 is located generally at a right-angle corner portion of the L-shaped slit 174. Moreover, the circular boss 172 is sized for interfitting within the elongated slot or opening 166 of the cylindrical skirt 164.

Figure 7:
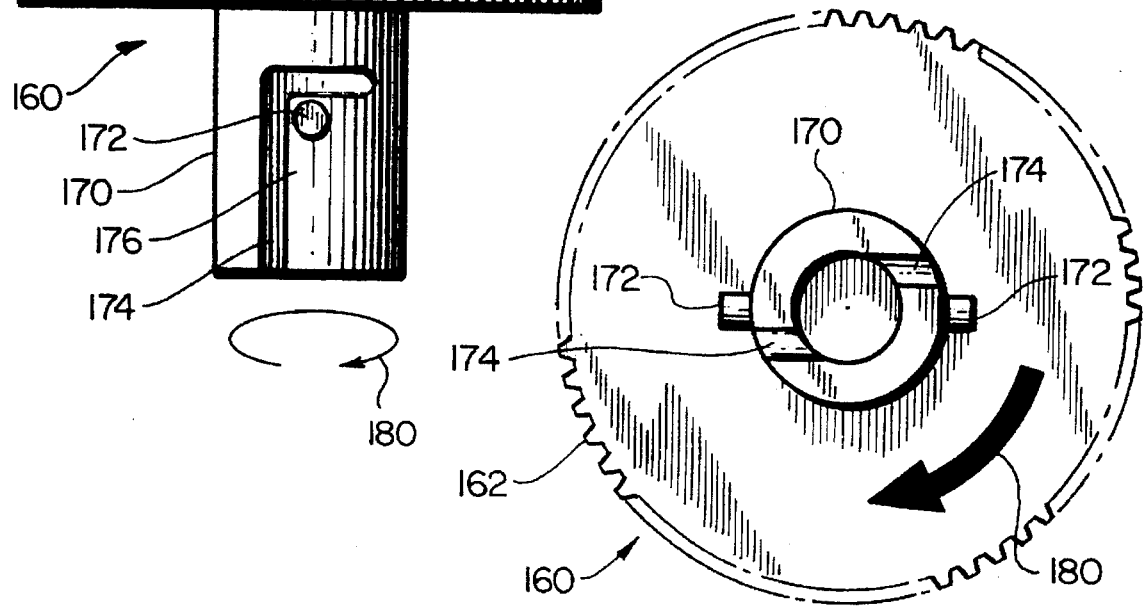
FIG. 7 is a bottom plan view of the element of FIG. 6.

In operation, the L-shaped slot 174 and the resulting definition of the cut-out portion 176 as, in effect, a flexible cantilevered portion or section relative to the remaining portion of the sleeve 170 will permit the cut out portion 176 to deform, flex, or deflect inwardly for releasing the engagement of the circular boss 172 with the slot 166 when the rotation of the split sleeve 170 is generally in the direction indicated by the arrow 180 in FIG. 7. However, when rotation is in the opposite direction, the boss 172 will tend to lock in place with respect to the slot 166.

A clicking detent action may be obtained with every 180° of rotation by the use of two such bosses 172 and slots 166 as in the illustrated embodiment. However, this clicking detent action might be reduced to one in 360° of rotation by using only a single slot 166, boss 172 and L-shaped slit 174. These respective interlocking or detent structures might be variously located with respect to the parts to obtain a clicking or detent action at other intervals of rotation as desired for a particular application.

While particular embodiments of the invention have been shown and described in detail, it will be obvious to those skilled in the art that changes and modifications of the present invention, in its various aspects, may be made without departing from the invention in its various aspect, some with changes and modifications may be matters of routine engineering or design, and while others may be apparent only after study. As such, the scope of the invention should not be limited by the particular embodiments and specific constructions described herein but should be defined by the appended claims and equivalents thereof. Accordingly, the aim of the appended claims is to cover all such changes and modifications as fall within the true spirit and scope of the invention.

The invention is claimed as follows:

1. A dry rotary damper, comprising:
    a housing defining a rotary axis and having an internal chamber, a base portion, a top portion having a through opening, and a rotor-engaging internal surface;
    a rotor having a shaft rotatably passing through said through opening of said housing and an engagement surface in sliding frictional engagement with said rotor-engaging internal surface of said housing;
    biasing means for biasing said rotor such that said engagement surface of said rotor is biased into frictional engagement with said rotor-engaging internal surface of said housing; and
    mounting means for mounting said biasing means within said internal chamber of said housing such that a radially outer portion of said biasing means is fixedly mounted within a first radial plane disposed at a first axial position with respect to said rotor-engaging internal surface of said housing while a radially inner portion of said biasing means is deflected out of said first radial plane and away from said rotor-engaging internal surface of said housing such that said radially inner portion of said biasing means is disposed within a second radial plane disposed at a second axial position further away from said rotor-engaging internal surface of said housing whereby a radially inner engagement portion of said biasing means can impinge upon said rotor so as to resiliently bias said engagement surface of said rotor into frictional engagement with said rotor-engaging internal surface of said housing.

2. A rotary damper according to claim 1, wherein:
    said housing base and top portions comprise separate members;

said biasing means comprises an annular member; and said mounting means comprises mutually inwardly projecting walls of said housing base and top portions defining aligned and opposed annular edge portions for engaging said annular member therebetween at a point radially spaced from said inner engagement impingement portion and in said first radial plane disposed closer to said rotor-engaging internal surface of said housing than said second plane within which said inner engagement portion of said annular member impinges upon said rotor so as to thereby resiliently deflect said radially inner portion of said annular member so as to exert a biasing force upon said rotor.

3. A rotary damper according to claim 2, wherein:

said inner engagement portion of said annular member which impinges upon said rotor comprises a radially inner edge portion thereof;

said rotor shaft projects through said annular member; and said projecting walls of said housing base and top portions engage said annular member radially outwardly of said radially inner edge portion.

4. A rotary damper according to claim 3, further comprising:

holding means for securing said housing top and base portions into engagement with each other and about said radially outer portion of said annular member for maintaining said deflection of said annular member.

5. A rotary damper as set forth in claim 4, wherein:

said base portion of said housing comprises threaded bores defined therein; and said holding means for securing said housing top and base portions together comprises threaded fasteners threadedly engaged within said threaded bores of said base portion of said housing.

6. A rotary damper according to claim 2, further comprising:

adjusting means for selectivity varying the amount of deflection of said annular member.

7. A rotary damper as set forth in claim 6, wherein said adjusting means comprises:

a radially extending plate being positionally axially adjustable within said internal chamber of said housing so as to axially adjust the disposition of said rotor within said internal chamber of said housing.

8. A rotary damper as set forth in claim 7, wherein:

said radially extending plate is interposed between said engagement surface of said rotor and said rotor-engaging internal surface of said housing.

9. A rotary damper according to claim 2, wherein:

said rotor comprises a rotor disk;

said rotor-engaging internal surface of said housing comprises an internal surface of said base portion of said housing;

said engagement surface of said rotor comprises a surface of said rotor disk which faces said rotor-engaging internal surface of said base portion of said housing; and means are provided upon said housing for changing the effective height of said rotor-engaging internal surface of said base portion of said housing so as to thereby change the amount of deflection of said annular member.

10. A rotary damper as set forth in claim 9, wherein said height changing means comprises:

a radially extending plate positionally adjustable in the to axially adjust the disposition of said rotor within said internal chamber of said housing.

11. A rotary damper as set forth in claim 10, wherein:

said radially extending plate is interposed between said engagement surface of said rotor disk and said rotor-engaging internal surface of said base portion of said housing.

12. Rotary damper according to claim 1, further comprising:

a driven member; and unidirectional rotation means interconnecting said rotor shaft with said driven member for causing said rotor shaft and said rotor to rotate in unison with said driven member when said driven member rotates in one direction and for causing said driven member to rotate freely relative to said rotor shaft and said rotor when said driven member is rotated in an opposite direction.

13. A rotary damper according to claim 12, wherein said unidirectional rotation means comprises:

a generally cylindrical sleeve projecting from one of said driven member and said rotor shaft and having first detent means formed thereon; and a generally cylindrical split sleeve projecting from the other one of said driven member and said rotor shaft and having an outer diameter sized for rotatable movement within an inner peripheral surface of said cylindrical sleeve, and second mating detent means for engagement with said first detent means for said generally cylindrical sleeve for permitting relative rotation between said generally cylindrical split sleeve and said generally cylindrical sleeve in one direction of rotation and for preventing said relative rotation in an opposite direction.

14. A rotary damper according to claim 13, wherein said split sleeve comprises:

a generally cylindrical wall having at least one L-shaped through slit extending longitudinally and circumferentially thereof; and said second mating detent means projects radially outwardly from a cut-out portion of said cylindrical wall wall as defined by said at least one L-shaped through slit.

15. A rotary damper according to claim 14, wherein:

said first detent means comprises an opening defined within an internal side wall of said generally cylindrical sleeve; and said second mating detent means comprises a boss sized for interfitting engagement within said opening of said generally cylindrical sleeve.

16. A rotary damper according to claim 1, further comprising:

adjusting means for selectively varying the amount of deflection of said biasing member.

17. A rotary damper as set forth in claim 16, wherein said adjusting means comprises:

a radially extending plate being positionally adjustable in the axial direction within said internal chamber of said housing so as to axially adjust the disposition of said rotor within said internal chamber of said housing.

18. A rotary damper as set forth in claim 17, wherein:

said radially extending plate is interposed between said engagement surface of said rotor and said rotor-engaging internal surface of said housing.

* * * * *